United States Patent
Cho et al.

(10) Patent No.: US 7,715,658 B2
(45) Date of Patent: May 11, 2010

(54) APPARATUS AND METHOD FOR SUPER-RESOLUTION ENHANCEMENT PROCESSING

(75) Inventors: Daesung Cho, Seoul (KR); Hyun Mun Kim, Seongnam-si (KR); László Cúzni, Yongin-si (KR); Gergely Császár, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 949 days.

(21) Appl. No.: 11/431,514

(22) Filed: May 11, 2006

(65) Prior Publication Data
US 2007/0041663 A1 Feb. 22, 2007

(30) Foreign Application Priority Data
Aug. 3, 2005 (KR) ............... 10-2005-0071157
Nov. 11, 2005 (KR) ............... 10-2005-0108270

(51) Int. Cl.
*G06K 9/32* (2006.01)

(52) U.S. Cl. .............. 382/299; 382/260; 382/239; 382/227; 382/226

(58) Field of Classification Search .............. None
See application file for complete search history.

(56) References Cited

U.S. PATENT DOCUMENTS

| | | | | |
|---|---|---|---|---|
| 4,485,409 A * | 11/1984 | Schumacher | ............ | 358/479 |
| 4,790,564 A * | 12/1988 | Larcher et al. | ............ | 283/69 |
| 6,029,195 A * | 2/2000 | Herz | ............ | 725/116 |
| 6,226,636 B1 * | 5/2001 | Abdel-Mottaleb et al. | ...... | 707/4 |
| 6,411,333 B1 * | 6/2002 | Auld et al. | ............ | 348/441 |
| 6,415,282 B1 * | 7/2002 | Mukherjea et al. | ............ | 707/3 |
| 6,434,280 B1 * | 8/2002 | Peleg et al. | ............ | 382/299 |

(Continued)

OTHER PUBLICATIONS

Chetverikov, D., et al., Joint Hungarian-Austrian Conference on Image Processing and Pattern Recognition, 5th Conference of the Hungarian Association for Image Processing and Pattern Recognition (KÉPAF), 29th Workshop of the Austrian Association for Pattern Recognition (OAGM/AAPR), cover page (1 pg).

(Continued)

*Primary Examiner*—Wesley Tucker
*Assistant Examiner*—Avinash Yentrapati
(74) *Attorney, Agent, or Firm*—Staas & Halsey LLP

(57) ABSTRACT

Provided is an apparatus and method for super-resolution enhancement processing. The apparatus includes a low-resolution image capturing unit, a patch pair generating unit, a patch pair database, and a high-resolution image reconstructing unit. The low-resolution image capturing unit captures a low-resolution image. The patch pair generating unit divides each of a plurality of high-resolution images into patches and generates a plurality of patch pairs composed of medium-frequency patches and high-frequency patches for the patches. The patch pair database stores the plurality of patch pairs generated by the patch pair generating unit. The high-resolution image reconstructing unit divides the low-resolution image into patches, searches in the patch pair database for a patch pair including a medium-frequency patch that is similar to that of the low-resolution image, and generates a reconstructed high-resolution image by inserting a high-frequency patch included in the found patch pair into a corresponding patch of the low-resolution image.

16 Claims, 14 Drawing Sheets
(3 of 14 Drawing Sheet(s) Filed in Color)

U.S. PATENT DOCUMENTS

| | | | |
|---|---|---|---|
| 6,466,696 B1* | 10/2002 | Politis | 382/226 |
| 6,470,335 B1* | 10/2002 | Marusak | 707/4 |
| 6,754,675 B2* | 6/2004 | Abdel-Mottaleb et al. | 707/104.1 |
| 6,766,067 B2* | 7/2004 | Freeman et al. | 382/299 |
| 6,920,231 B1* | 7/2005 | Griffin | 382/115 |
| 7,068,808 B1* | 6/2006 | Prokoski | 382/100 |
| 7,310,445 B2* | 12/2007 | Kupeev et al. | 382/173 |
| 7,359,533 B2* | 4/2008 | Moon et al. | 382/124 |
| 7,373,586 B2* | 5/2008 | Abe et al. | 715/200 |
| 7,483,890 B2* | 1/2009 | Zhou et al. | 707/4 |
| 2004/0218834 A1 | 11/2004 | Bishop et al. | 382/299 |
| 2005/0044520 A1* | 2/2005 | Vuong et al. | 716/12 |
| 2005/0157909 A1* | 7/2005 | Griffin | 382/115 |
| 2005/0240614 A1* | 10/2005 | Barsness et al. | 707/102 |

OTHER PUBLICATIONS

Joint Hungarian-Austrian Conference on Image Processing and Pattern Recognition, May 11-13, 2005, Veszprém, Hungary, 1 pg, http://vision.vein.hu/HACIPPR/.

Table of Contents (4 pgs), Joint Hungarian-Austrian Conference on Image Processing and Pattern Recognition, May 11, 2005.

"Enhancements on Example-Based Super-Resolution", Czuni, Laszlo et al., Joint Hungarian-Austrian Conference on Image Processing and Pattern Recognition, pp. 251-258, Veszprém, Hungary, May 11, 2005.

* cited by examiner

APPARATUS AND METHOD FOR SUPER-RESOLUTION ENHANCEMENT PROCESSING

CROSS-REFERENCE TO RELATED APPLICATIONS

This application claims the benefit of Korean Application No. 10-2005-0071157, filed Aug. 3, 2005 and Korean Application No. 10-2005-0108270, filed Nov. 11, 2005, in the Korean Intellectual Property Office, the disclosure of which is incorporated herein by reference.

This application claims the benefit of Korean Patent Application Nos. 10-2005-0071157, filed on Aug. 3, 2005 and 10-2005-0108270, filed on Nov. 11, 2005, in the Korean Intellectual Property Office, the disclosure of which is incorporated herein in its entirety by reference.

BACKGROUND OF THE INVENTION

1. Field of the Invention

The present invention relates to adjusting the resolution of an image, and more particularly, to an apparatus and method for super-resolution enhancement processing to generate a high-resolution image from a low-resolution image.

2. Description of the Related Art

In general, zooming and interpolation or filtering is used to change a low-resolution image obtained by remote capturing into a perceivable high-resolution image. In other words, interpolation is performed between low-resolution pixels or groups composed of a plurality of pixels to estimate high-resolution pixels or image data is filtered to improve high-frequency information of edges in an image. However, when interpolation is used, a high-resolution image can be generated, but high-frequency image data required to improve the sharpness of the image cannot be obtained. When filtering is used, the sharpness of the image can be improved, but the noise of the image increases, causing degradation in the visual quality of a high-resolution image.

Super-resolution enhancement processing is intended to generate a high-resolution image having finer details than a high-resolution image generated by interpolation such as bilinear interpolation or Bicubic interpolation or filtering. U.S. Pat. No. 6,766,067 and U.S. Patent Publication No. 2004-0218834 disclose techniques for super-resolution enhancement processing. U.S. Pat. No. 6,766,067 deals with high-resolution improvement processing for still images and U.S. Patent Publication No. 2004-0218834 deals with high-resolution improvement processing for moving images.

SUMMARY OF THE INVENTION

Additional aspects and/or advantages of the invention will be set forth in part in the description which follows and, in part, will be apparent from the description, or may be learned by practice of the invention.

Additional aspects, features, and/or advantages of the invention will be set forth in part in the description which follows and, in part, will be apparent from the description, or may be learned by practice of the invention.

The present invention provides an apparatus and method for high-resolution enhancement processing to improve processing speed and accuracy in the generation of a high-resolution image from a low-resolution image.

According to one aspect of the present invention, there is provided an apparatus for super-resolution enhancement processing. The apparatus includes a low-resolution image capturing unit, a patch pair generating unit, a patch pair database, and a high-resolution image reconstructing unit. The low-resolution image capturing unit captures a low-resolution image. The patch pair generating unit divides each of a plurality of high-resolution images into patches and generates a plurality of patch pairs composed of medium-frequency patches and high-frequency patches for the patches. The patch pair database stores the plurality of patch pairs generated by the patch pair generating unit. The high-resolution image reconstructing unit divides the low-resolution image into patches, searches in the patch pair database for a patch pair including a medium-frequency patch that is similar to that of the low-resolution image, and generates a reconstructed high-resolution image by inserting a high-frequency patch included in the found patch pair into a corresponding patch of the low-resolution image.

According to another aspect of the present invention, there is provided a method for super-resolution enhancement processing. The method includes dividing each of a plurality of high-resolution images into patches, generating a plurality of patch pairs composed of medium-frequency patches and high-frequency patches for the patches, and storing the generated patch pairs in a patch pair database, and dividing a low-resolution image into patches, searching in the patch pair database for a patch pair including a medium-frequency patch that is similar to that of the low-resolution image, and generating a reconstructed high-resolution image by inserting a high-frequency patch included in the found patch pair into a corresponding patch of the low-resolution image.

According to still another aspect of the present invention, there is provided at least one computer readable medium storing instructions that control at least one processor to perform a method for super-resolution enhancement processing.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and/or other aspects, features, and advantages of the invention will become apparent and more readily appreciated from the following description of exemplary embodiments, taken in conjunction with the accompanying drawings of which.

DETAILED DESCRIPTION OF THE PREFERRED EMBODIMENTS

Figure 1:
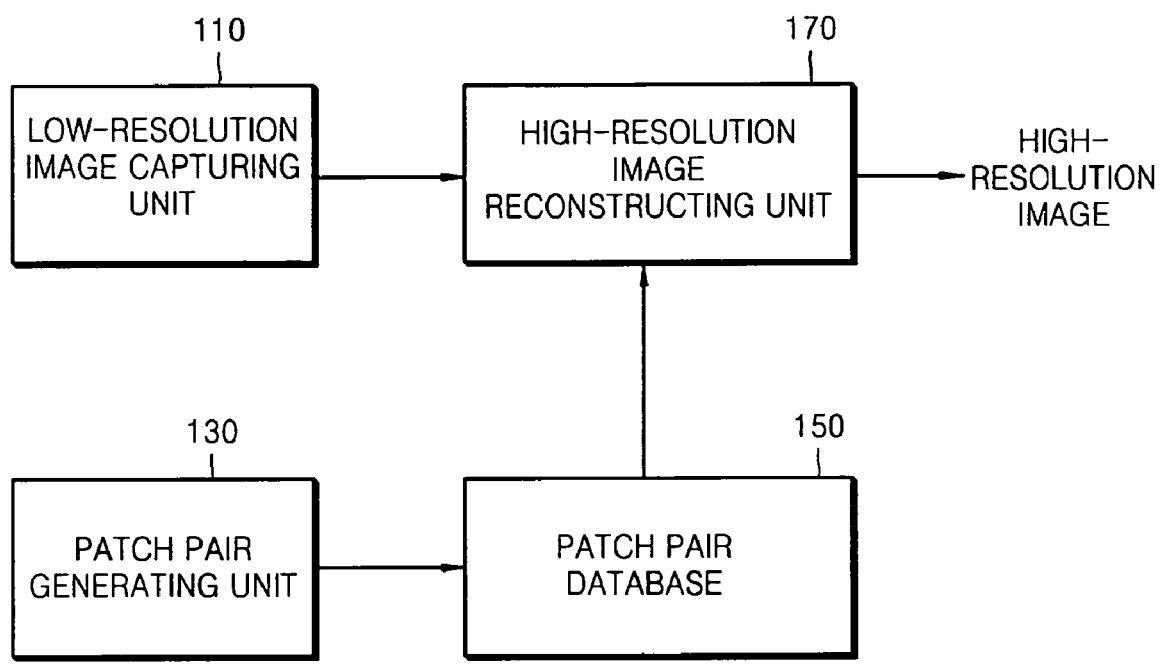
FIG. 1 is a block diagram of an apparatus for high-resolution improvement processing according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Basic principles of a super-resolution enhancement processing algorithm according to the present invention will now be summarized.

First, a patch pair database is an example-based resolution improvement technique including medium-frequency patch and high-frequency patch pairs.

Second, the patch pair database is indexed in a tree structure.

Third, reconstruction is performed by searching in the patch pair database 150 for a medium-frequency patch that is similar to that in a query image. If a good medium-frequency patch is found in the patch pair database, a high-frequency patch of the medium-frequency patch is obtained and is then added to the query image to obtain fine details.

Fourth, to maintain coherence among adjacent high-frequency patches in a reconstructed high-resolution image, a one-run raster scanning algorithm considering edge pixels from top-left patches is used.

The above principles are disclosed in more detail in U.S. Pat. No. 6,766,067, and U.S. Patent Publication No. 2004-218834.

FIG. 1 is a block diagram of an apparatus for high-resolution improvement processing according to an embodiment of the present invention. The apparatus includes a low-resolution image capturing unit 110, a patch pair generating unit 130, a patch pair database 150, and a high-resolution image reconstructing unit 170.

Referring to FIG. 1, the low-resolution image capturing unit 110 is implemented with a streaming video server or a camera and provides an image sequence of low-resolution frames or a low-resolution image to the high-resolution image reconstructing unit 170.

The patch pair generating unit 130 divides each of a plurality of collected high-resolution images into patches and generates a patch pair composed of a medium-frequency patch and a high-frequency patch for each of the patches of the high-resolution image. Here, the patch takes the form of a block composed of specific pixels. When Bicubic interpolation is used to reduce or enlarge an image in the present invention, a patch pair learned and generated by the patch pair generating unit 130 includes information about a difference between a high-resolution image reconstructed by Bicubic interpolation and the original high-resolution image. In one patch pair, edge pixels from top-left patches are considered to maintain coherence among adjacent high-frequency patches in the reconstructed high-resolution image.

The patch pair database 150 creates a database of a plurality of patch pairs generated by the patch pair generating unit 130. At this time, it is desirable to use a database having a tree-structure, e.g., a KD-tree structure, for fast searching. In addition, a medium-frequency patch and a high-frequency patch included in a patch pair and edge pixels that are overlapping portions in a high-frequency patch may be expressed as vectors. The medium-frequency patch and the high-frequency patch included in the patch pair and the edge pixels of the high-frequency patch may be stored in association or stored separately by adding a pointer indicating the high-frequency patch corresponding to the medium-frequency patch. By expressing patches as vectors, efficient searching is possible. In other words, the medium-frequency patch included in the patch pair is configured not to overlap its adjacent patch and the high-frequency patch included in the patch pair is configured to partially overlap already-reconstructed adjacent patches, i.e., adjacent patches that are located above and to the left of the high-frequency patch, by for example, one pixel. In another embodiment of the present invention, the medium-frequency patch may be configured to form for example, a one-pixel overlap with its adjacent patches only in a gray channel.

The high-resolution image reconstructing unit 170 divides a low-resolution image provided from the low-resolution image capturing unit 110 into patches, and searches in the patch pair database 150 for a patch pair including a medium-frequency patch that is similar to that of the low-resolution image and generates patches of a high-resolution image by inserting a high-frequency patch included in the found patch pair into a corresponding patch of the low-resolution image.

In an embodiment of the present invention, a low-resolution image provided by the low-resolution image capturing unit 110 implemented with a server may be transmitted to the high-resolution image generating unit 170 implemented with a client via a communication network. In another embodiment of the present invention, the low-resolution image capturing unit 110 may be implemented on the client, together with the patch pair generating unit 130, the patch pair database 150, and the high-resolution image reconstructing unit 170, or stored on a storage medium coupled to the client.

Figure 2:
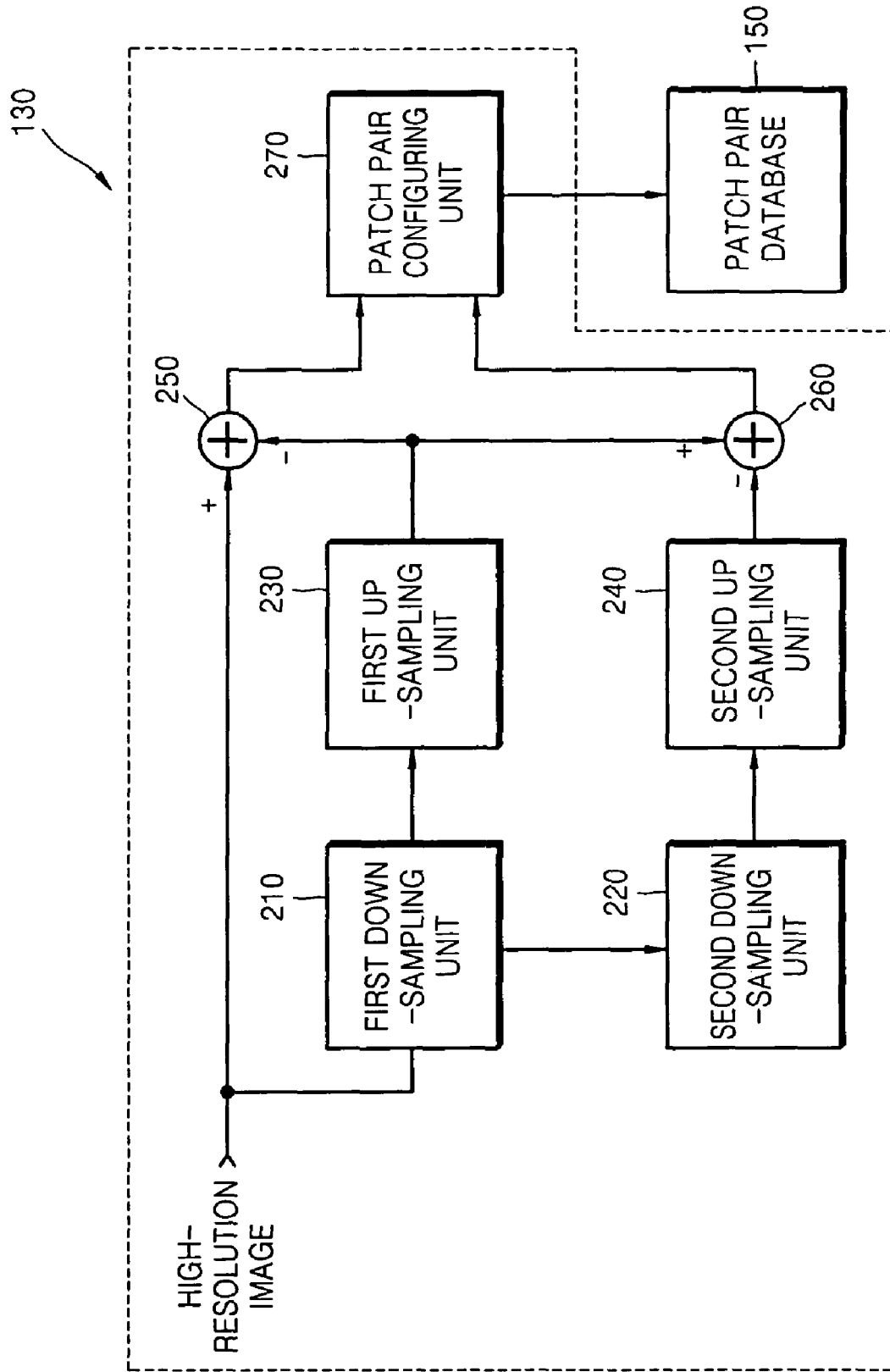
FIG. 2 is a detailed block diagram of a patch pair generating unit of FIG. 1.

FIG. 2 is a detailed block diagram of the patch pair generating unit 130 of FIG. 1. The patch pair generating unit 130 includes a first down-sampling unit 210, a second down-sampling unit 220, a first up-sampling unit 230, a second down-sampling unit 240, a first subtracting unit 250, a second subtracting unit 260, and a patch pair configuring unit 270. Here, a first normalizing unit (not shown) for normalizing a high-frequency image and a medium-frequency image provided from the first subtracting unit 250 and the second subtracting unit 260 may be further included in front of the patch pair configuring unit 270.

Referring to FIG. 2, the first down-sampling unit 210 reduces an image by performing first down-sampling for low band pass filtering on a high-resolution image, e.g., using Bicubic interpolation. In an embodiment of the present invention, the high-resolution image is reduced to ½ of its original size. At this time, smoothing may be optionally performed using a Gaussian kernel or a smoothing convolution kernel prior to Bicubic interpolation.

The second down-sampling unit 220 reduces an image by performing second down-sampling for low band pass filtering on the first down-sampled image of the first down-sampling unit 210, e.g., using Bicubic interpolation. In an embodiment of the present invention, the first down-sampled image is reduced to ½ of its original size. Similarly, smoothing may be optionally performed prior to Bicubic interpolation.

The first up-sampling unit 230 enlarges an image by performing first up-sampling on the first down-sampled image of the first down-sampling unit 210, using, e.g., Bicubic interpolation. In an embodiment of the present invention, the first up-sampling unit 230 enlarges the first down-sampled image to 2 times of the original size and generates an image having a lower resolution than the high-resolution image, i.e., an intermediate image.

The second up-sampling unit 240 enlarges an image by performing second up-sampling on the second down-sampled image of the second down-sampling unit 220, using, e.g., Bicubic interpolation. In an embodiment of the present invention, the second up-sampling unit 240 enlarges the second down-sampled image to 2 times of the original size and generates an image having a lower resolution than the intermediate image, i.e., a low-frequency image.

The first subtracting unit 250 subtracts the intermediate image provided by the first up-sampling unit 230 from the high-resolution image, thereby generating a high-frequency image. The second subtracting unit 260 subtracts the low-frequency image provided by the second up-sampling unit 240 from the intermediate image provided from the first up-sampling unit 230, thereby generating a medium-frequency image.

The patch pair configuring unit 270 divides a high-frequency image provided from the first subtracting unit 250 and a medium-frequency image provided from the second subtracting unit 260 into patches, configures a pair of patches corresponding to the spatially same position, and stores the pair of patches in the patch pair database 150. A patch structure in which a patch partially overlaps its adjacent patches is conventionally used not only for the high-frequency image but also the medium-frequency image, but such a patch structure is used only for the high-frequency image in the present invention. Conventionally, an overlapping patch is composed of 7×7 pixels in the medium-frequency image and thus, a vector representing one patch in a color image has a dimension of 7×7×3. As a result, an additional dimension reducing process such as principal component analysis (PCA) is required. However, in the present invention, a non-overlapping patch is preferably composed of 2×2 pixels in a medium-frequency image obtained by down-sampling and up-sampling and thus, a vector representing one patch in a color image has a dimension of 2×2×3. Since the medium-frequency image obtained by down-sampling and up-sampling is a difference between strongly smoothed images, the dimension of a vector representing one patch can be reduced without a loss of information. As a result, the size of the patch pair database 150 can be reduced and searching speed can be increased.

The first normalizing unit (not shown) performs intensity normalization by obtaining a local energy image composed of the square roots of the intensities of pixels included in the medium-frequency image provided from the second subtracting unit 260 and dividing the high-frequency image provided from the first subtracting unit 250 and the medium-frequency image provided from the second subtracting unit 260 by the obtained local energy image.

In an embodiment of the present invention, to balance the visual sharpness of a reconstructed high-resolution image with reliability measured using peak signal-to-noise ratio (PSNR), the high-frequency patch obtained in the patch pair configuring unit 270 is smoothed.

Figure 3A:
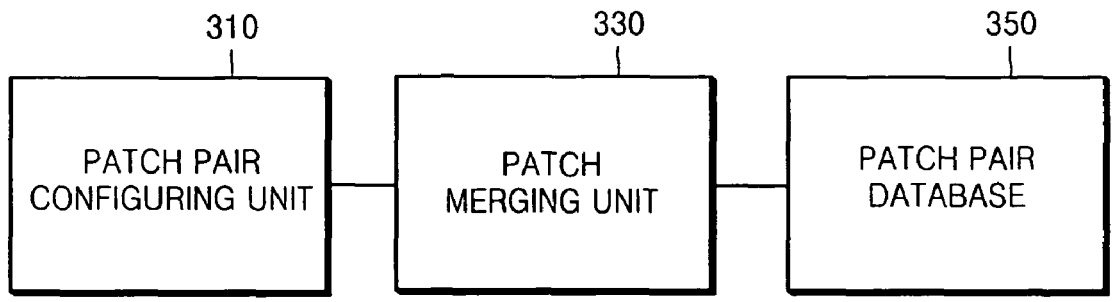
FIGS. 3A and 3B are views for explaining a patch merging process for reducing the redundancy of a patch pair database of FIG. 1.
Figure 3B:
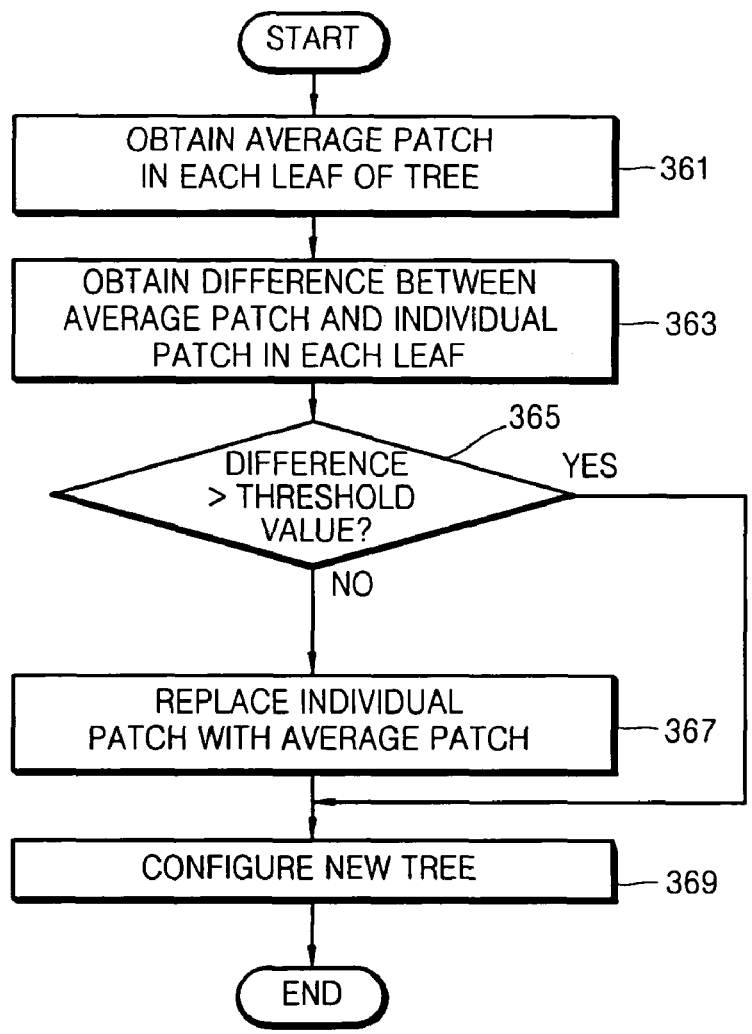

FIGS. 3A and 3B are views for explaining a patch merging process to reduce the redundancy of the patch pair database 150 of FIG. 1. Referring to FIG. 3A, a patch merging unit 330 is positioned between a patch pair configuring unit 310 and a patch pair database 350 and merges similar patterns in leaves of a KD-tree.

Referring to FIG. 3B, the patch merging unit 330 operates as follows.

In operation 361, the patch merging unit 330 obtains an average patch from each leaf of a KD-tree stored in the patch pair database 350. In operation 363, the patch merging unit 330 obtains a difference between the average patch and an individual patch in each leaf. In operation 365, the patch merging unit 330 compares the obtained difference with a predetermined threshold value. If the difference is less than or equal to the threshold value, the patch merging unit 330 replaces the individual patch with the average patch in operation 367. If the difference is greater than the threshold value, the patch merging unit 330 leaves the individual patch as it is. The threshold value may be experimentally or empirically set to the optimal value by those skilled in the art.

In operation 369, the patch merging unit 330 constructs a new KD-tree with patches whose number is reduced by the replacement processing performed in operation 367.

Figure 4A:
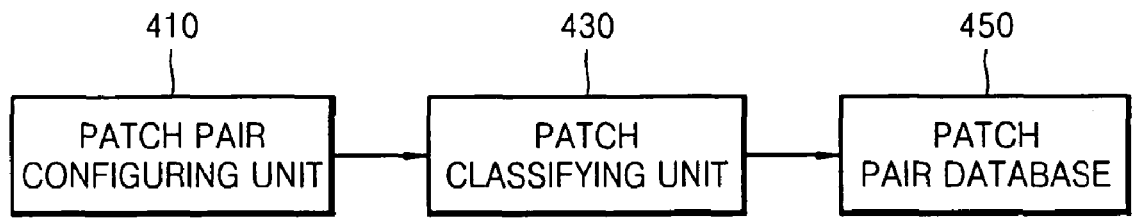
FIGS. 4A through 4C are views for explaining a patch classifying process for speeding up searching in the patch pair database of FIG. 1.
Figure 4B:
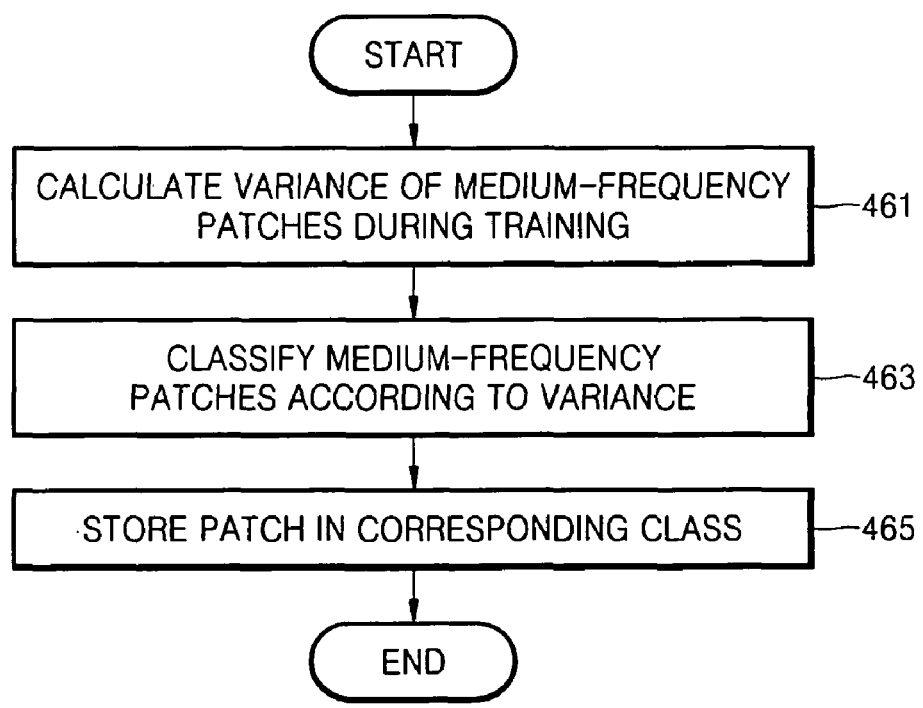
Figure 4C:
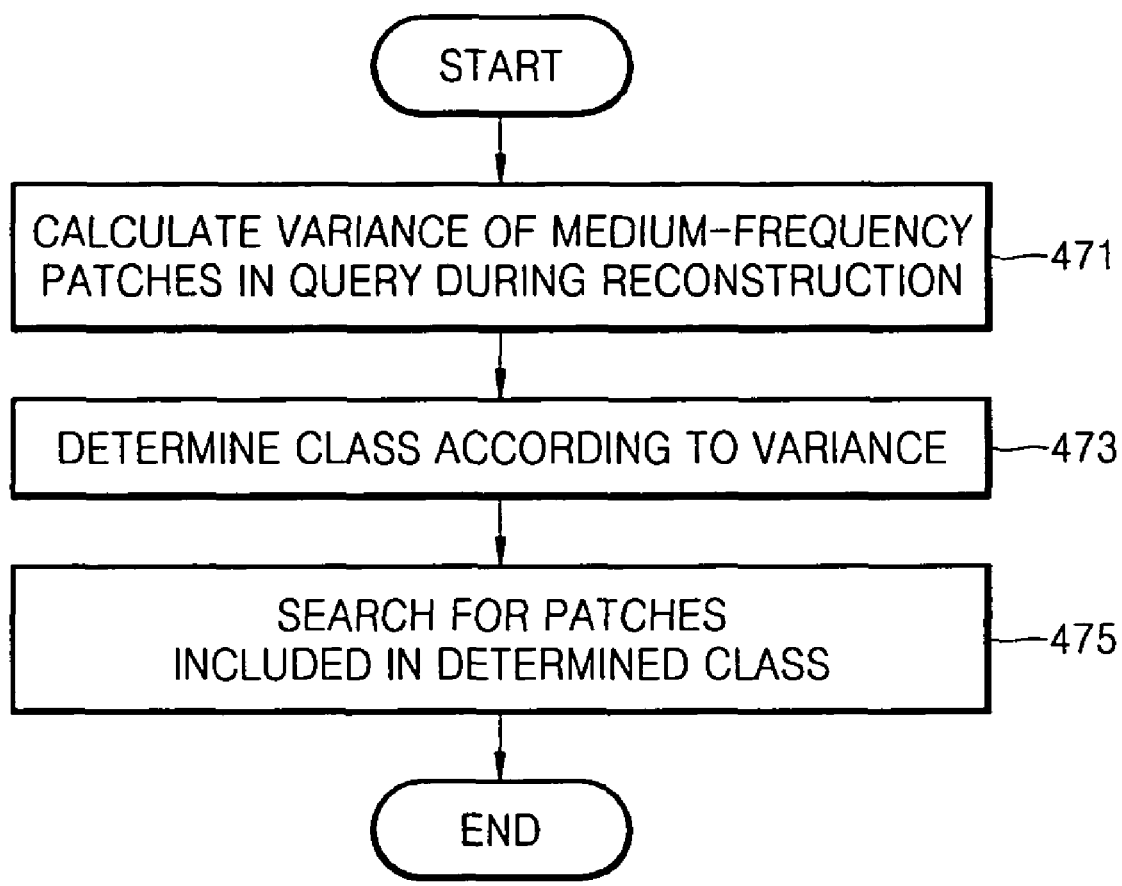

FIGS. 4A through 4C are views for explaining a patch classifying process for speeding up searching in the patch pair database 150 of FIG. 1. Referring to FIG. 4A, a patch classifying unit 430 is positioned between a patch pair configuring unit 410 and a patch pair database 450.

Referring to FIG. 4B, the patch classifying unit 430 operates as follows. In operation 461, the patch classifying unit 430 calculates the variance of medium-frequency patches during training. In operation 463, the patch classifying unit 430 classifies the medium-frequency patches into a plurality of patch classes according to the calculated variance. In operation 465, the patch classifying unit 430 stores each of the medium-frequency patches in a corresponding patch class in the patch pair database 450.

Referring to FIG. 4C, a query is searched for using the patch pair database 450 after the patch classifying process as follows. In operation 471, the variance of medium-frequency patches of a query is calculated during reconstruction. In operation 473, a class is determined according to the calculated variance. In operation 475, the query is searched for in the patch pair database 450 using patches included in the determined class. In other words, the patch classifying unit 430 may be positioned between a searching unit 540 of FIG. 5 and the patch pair database 150.

For example, the medium-frequency patches are classified into a low-variance patch class and a high-variance patch class according to a threshold value of 1. In the patch pair database 150, different databases are generated for the two patch classes.

Figure 5:
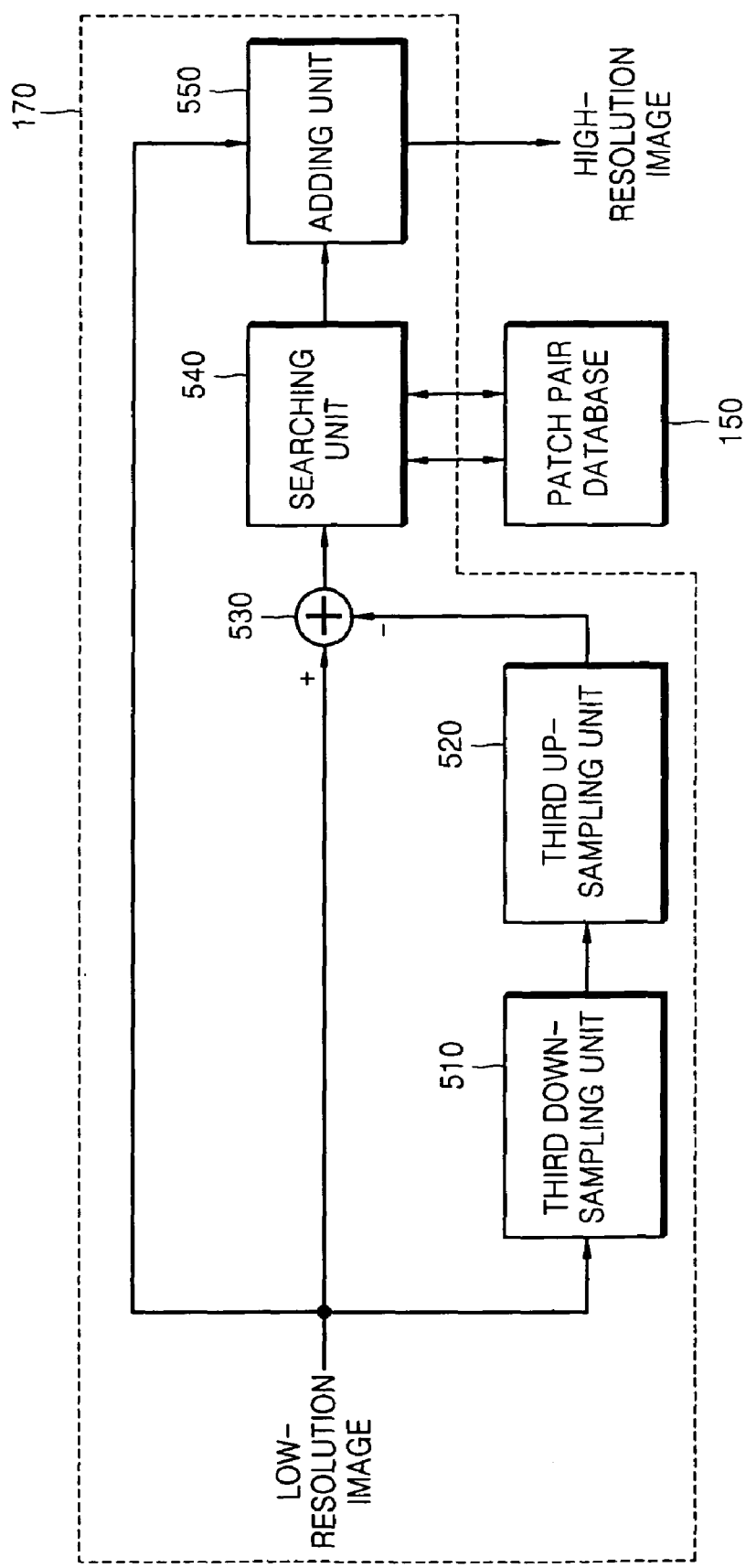
FIG. 5 is a detailed block diagram of a high-resolution image reconstructing unit of FIG. 1.

FIG. 5 is a detailed block diagram of the high-resolution image reconstructing unit 170 of FIG. 1. The high-resolution image reconstructing unit 170 includes a third down-sampling unit 510, a third up-sampling unit 520, a third subtracting unit 530, the searching unit 540, and an adding unit 550. A second normalizing unit (not shown) for normalizing a medium-frequency image provided from the third subtracting unit 530 may be included in front of the searching unit 540, and a denormalizing unit (not shown) for denormalizing a high-frequency patch included in a patch pair obtained as a result of searching may be included in the rear of the searching unit 540.

Referring to FIG. 5, the third down-sampling unit 510 reduces the size of an image by performing third down-sampling for low band pass filtering on a low-resolution image that is a query image, e.g., using Bicubic interpolation. In an embodiment of the present invention, the low-resolution image is reduced to ½ of its original size. At this time, smoothing may be optionally performed using a Gaussian kernel or a smoothing convolution kernel prior to Bicubic interpolation. The low-resolution image that is the query image corresponds to an intermediate image of a reconstructed high-resolution image.

The third up-sampling unit 520 enlarges an image by performing third up-sampling on the third down-sampled image of the third down-sampling unit 510, using, e.g., Bicubic interpolation. In an embodiment of the present invention, the third up-sampling unit 520 enlarges the third down-sampled image to 2 times of the original size and generates a low-frequency image for the low-resolution image.

The third subtracting unit 530 subtracts the low-frequency image provided from the third up-sampling unit 520 from the low-resolution image, thereby generating a medium-frequency image.

The searching unit 540 divides the medium-frequency image provided from the third subtracting unit 530 into patches and searches in the patch pair database 150 for a patch pair including a medium-frequency patch that is similar to that of the low-resolution image and a high-frequency patch having an overlapping portion that is similar to edge pixels of previously found high-frequency patches. If reconstruction is performed according to a raster scan order, edge pixels of high-frequency patches are bottom-right edge pixels. Like in the patch pair configuring unit 270 of the patch pair generating unit 130, the medium-frequency patch is a non-overlapping patch and is composed of 2×2 pixels.

In details of the operation of the searching unit 540, edge pixels of adjacent high-frequency patches are obtained in an already-reconstructed high-resolution image. When reconstruction is performed according to a raster scan order, bottom-right pixels of adjacent patches are generally matched with top-left edge pixels of candidate high-frequency patches stored in the patch pair database 150. To this end, the searching unit 540 searches for the most similar vector in the patch pair database 150 in which normalized medium-frequency patches and vectors generated from edge pixels are learned and stored.

To search in the patch pair database 150 for a medium-frequency patch that is most similar to that of the low-resolution image and an edge pixel of a high-frequency patch, a patch pair that minimizes the following cost function E is obtained.

$$E = E_1 + \alpha E_2 \quad (1),$$

where the cost function E is composed of a medium-frequency patch of a query, a medium-frequency patch stored in the patch pair database 150, an edge pixel of an already-reconstructed adjacent patch, and an edge pixel of a candidate high-frequency patch stored in the patch pair database 150. Thus, $E_1$ indicates a distance $L_1$ or $L_2$ between the medium-frequency patch of the query and candidate high-frequency patches, and $E_2$ indicates a distance $L_1$ or $L_2$ between already-reconstructed adjacent patches, i.e., a top-left patch and over-lapping edge pixels of candidate high-frequency patches. $L_1$ indicates an absolute norm and $L_2$ indicates an Euclidean norm.

In other words, similarity between two vectors is calculated using a cost function having two terms like Equation 1. The first term of the cost function is intended to calculate similarity between normalized medium-frequency patches (query and candidates). The second term of the cost function is intended to calculate similarity between top-left edge pixels of stored candidate high-frequency patches and bottom-right edge pixels of already-reconstructed adjacent high-frequency patches.

In an embodiment of the present invention, when searching in the KD-tree is completed, a candidate list is maintained, $E_2$ is calculated only for best matching hits included in the candidate list, and a patch pair including an edge pixel having the minimum value is determined to be the optimal solution.

The adding unit 550 generates a patch of a high-resolution image by inserting a high-frequency patch included in the found patch pair by the searching unit 540 into a corresponding patch of a low-resolution image.

The second normalizing unit (not shown) performs intensity normalization by obtaining a local energy image composed of the square roots of intensities of pixels included in the medium-frequency image provided from the third subtracting unit 530 and dividing the medium-frequency image provided from the third subtracting unit 530 by the obtained local energy image. The denormalizing unit (not shown) performs denormalization by multiplying the high-frequency patch included in the found patch pair by the searching unit 540 by the same local energy image.

Figure 6:
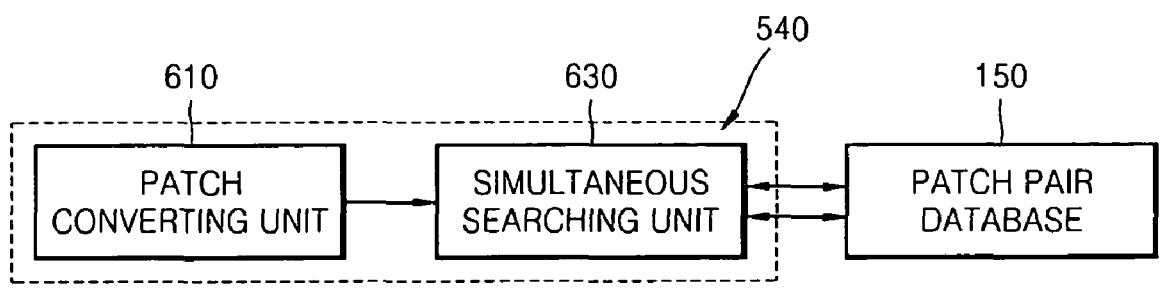
FIG. 6 is a detailed block diagram of a searching unit of FIG. 5.

FIG. 6 is a detailed block diagram of the searching unit 540 of FIG. 5. The searching unit 540 includes a patch converting unit 610 and a simultaneous searching unit 630.

Figure 7:
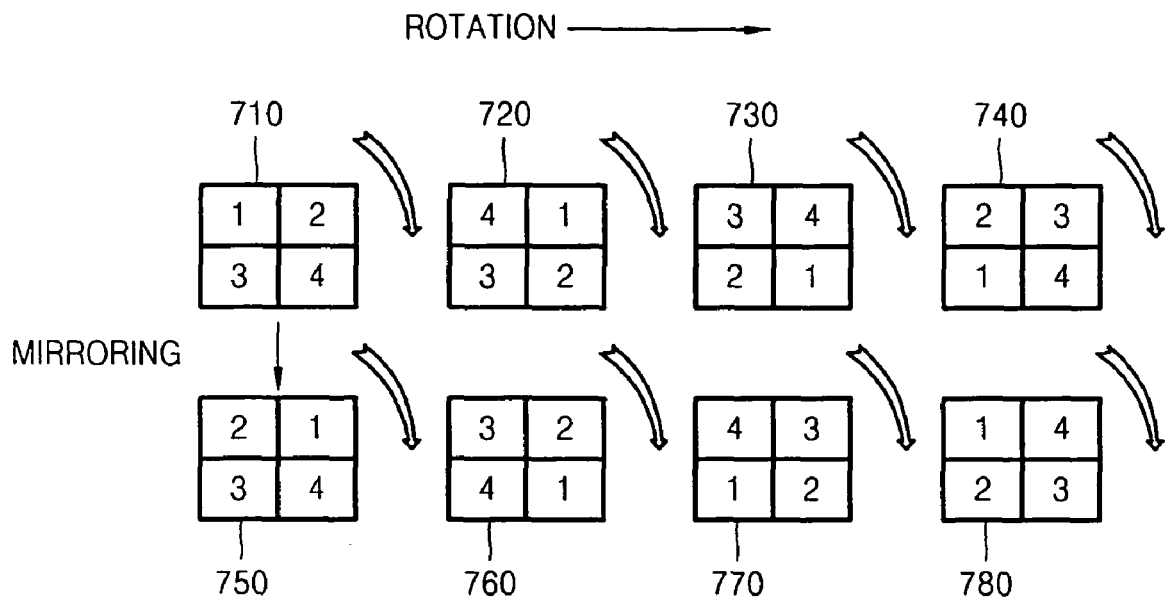
FIG. 7 illustrates geometrically converted versions of a patch provided by a patch converting unit of FIG. 6.

Referring to FIG. 6, the patch converting unit 610 performs rotational conversion and mirroring conversion on each query defined in a medium-frequency image corresponding to a low-resolution image, i.e., each patch, thereby obtaining a plurality of geometrically converted versions with respect to each patch. The patch converting unit 610 provides 7 geometrically converted versions as illustrated in FIG. 7. Referring to FIG. 7, the original 2×2 patch 710 is rotationally converted into patches 720, 730, and 740, and a patch 750 obtained by mirroring the patch 710 is rotationally converted into patches 760, 770, and 780.

The simultaneous searching unit 630 simultaneously searches for a plurality of geometrically converted versions of a patch, provided from the patch converting unit 610, in the patch pair database 150 having a tree structure using a single shared candidate list. As a result of simultaneous searching, a single shared candidate list in which matching hits are rearranged is provided.

To find a superior matching one in the patch pair database 150, a geometrically converted version of a query is obtained. In other words, by rotating or mirroring a query patch, the possibility of finding a superior matching one for the query patch can be directly increased. This approach is based on a general-fact that degradation from a high-resolution image to a low-resolution image is isotropic and functions in the same manner in a mirroring-converted image. In other words, if a candidate for the query patch is not found, 7 alternatives can be easily obtained by rotating and mirroring the query patch. In addition, if the best matching one is found in the patch pair database 150, inverse geometric conversion should be applied. The searching time may be increased by 8 times using a plurality of geometrically converted versions of a query, but it can be reduced by simultaneous searching in the present invention.

Figure 8:
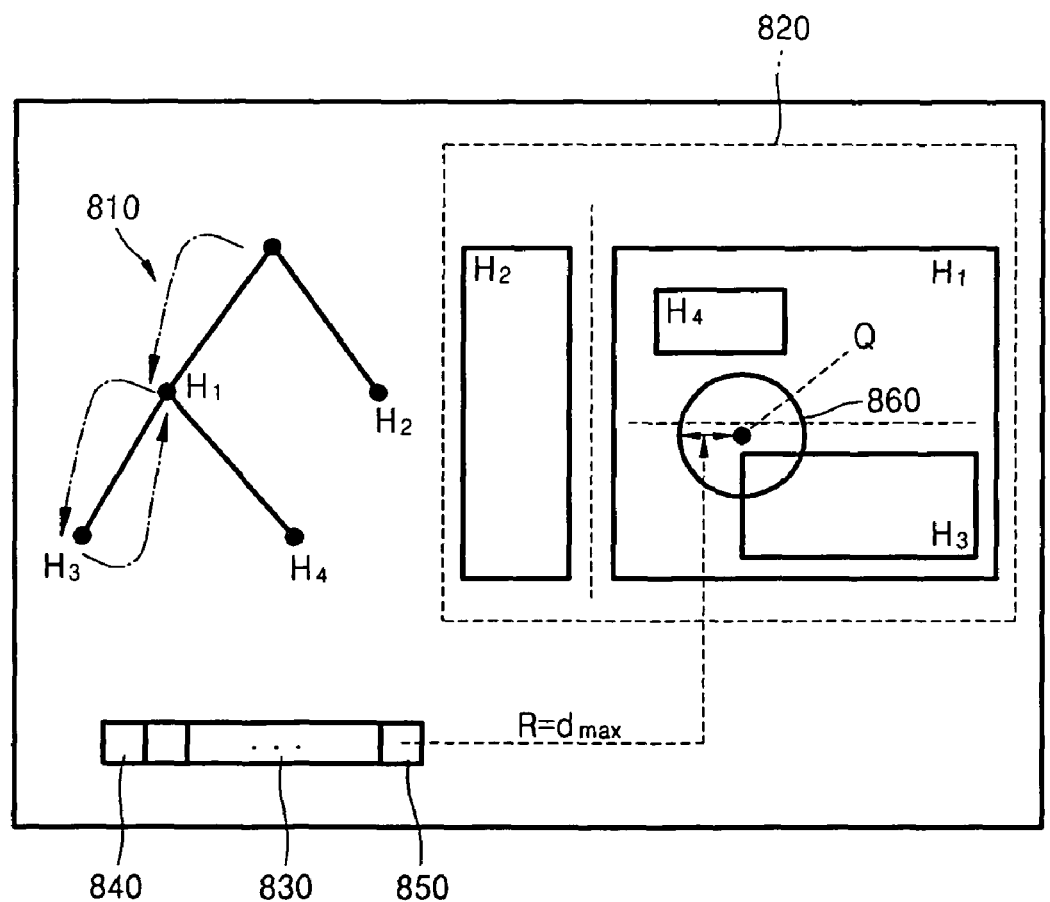
FIG. 8 illustrates a process of searching in a KD-tree for a query using a candidate list.

FIG. 8 illustrates a process of searching in a KD-tree for a query Q using a candidate list.

Referring to FIG. 8, a searching trace 810 for the query Q starts from a root tree indicating an entire feature space 820. At this time, a candidate list 830 including best matching hits from a best hit 840 to a worst hit 850 as a result of searching is generated. At each node, the entire feature space is divided into sub-spaces according to dimension. Searching continues in a sub-tree in a sub-space that is a dividing plane including the query, i.e., in a branch. When the branch is inspected, searching continues in another sub-space at the same time. A ball-cube-overlap test is carried out in a sub-tree. In a box including sub-trees at nodes, it is not necessary to inspect a sub-tree that does not overlap a ball 860 having a radius R that is equal to a distance dmax between the worst hit 850 and the query Q. This is because a better matching one than the worst hit 850 included in the candidate list 830 cannot be found. In addition, a test with respect to only a sub-tree is satisfactory if the ball 860 is within a box including the sub-tree. This is because the ball 860 would not overlap any other box of other branches. Such a test is called a ball-within-cube test. If the ball-within-cube test is successful, searching is terminated and a candidate list including best matching hits, i.e., points, is generated.

The feature space 820 of FIG. 8 is a two-dimensional space. The root node divides the feature space 820 into $H_1$ and $H_2$ and $H_1$ is divided into $H_3$ and $H_4$. When points near to the query Q are searched for, $H_1$ and $H_3$ are first tested and hits are found in $H_1$ and $H_3$. Before a test with respect to $H_4$, the ball-cube-overlap test is performed. The ball 860 corresponding to the worst hit 850 around the query Q does not overlap $H_4$ and thus, $H_4$ is ignored. If the ball 860 is within $H_1$, searching is not performed in other branches and is terminated in $H_1$.

Figure 9:
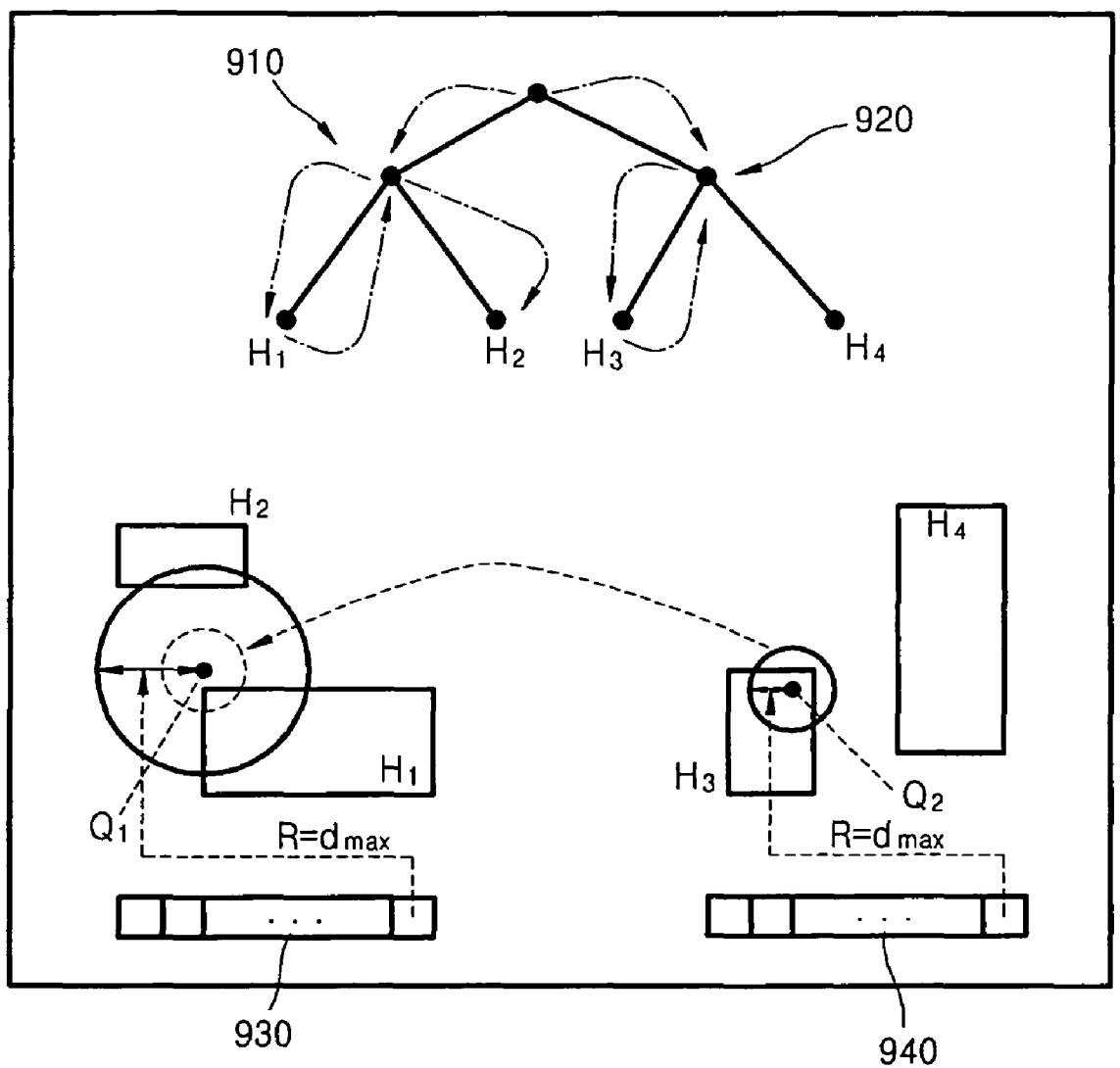
FIG. 9 illustrates independent searching processes for two geometrically converted versions of a query.

FIG. 9 illustrates independent searching processes for two geometrically converted versions of a query.

Referring to FIG. 9, queries $Q_1$ and $Q_2$ have candidate lists 930 and 940, respectively and each searching trace 910 and 920 for the queries $Q_1$ and $Q_2$ starts from a root tree. Searching depends on the distance of a worst hit in the candidate lists 930 and 940 because the distance of a worst hit is equal to the radius of a ball around a query point in the ball-within-cube test and the ball-cube-overlap test. Since the ball-cube-overlap test is successful if the query $Q_1$ is the center of the ball and $R=d_{1,max}$, as a result of the ball-cube-overlap test, searching for the query $Q_1$ continues in the sub-space $H_2$. In contrast, the query $Q_2$ is the center of the ball and the ball does not overlap the sub-space $H_4$ if $R=d_{2,max}$, searching is not performed in the sub-space $H_4$. Since the sub-space $H_2$ is excluded, it is more efficient to use $R=d_{2,max}$ to search for the query $Q_1$. For simultaneous searching for a more number of queries, a ball having the smallest radius should be used.

Sharing only one candidate list with respect to all geometrically converted versions can greatly reduce searching time. In a searching method suggested in the present invention, geometrically converted versions are sequentially selected and similarity is calculated according to a predetermined order, and at the same time, similar patches are searched for. First, a query 1 is selected and searching starts from a root node of a KD-tree and continues at lower nodes from the root node by one level. It is then determined in which branch searching is to be first performed or in which branches searching is to be simultaneously performed. Then, a query 2 is selected and searching starts from the root node and continues at lower nodes from the root node by one level independently of other queries. At each node, a shared candidate list is updated. Since the shared candidate list has best matching hits for all 8 queries, the other queries race against one another to fill the shared candidate list. The shared candidate list has a great influence upon determining whether to perform searching in a new branch of a tree. In this case, 8 geometrically converted versions race against one another to fill the shared candidate list and some of them have lower chances of moving along branches of the KD-tree. This is because other geometrically converted versions have found better candidates than geometrically converted versions in branches that have not yet been searched. In this way, all geometrically converted versions race against one another in the shared candidate list, thereby reducing movement in the tree and significantly reducing time. Basically, when the geometrically converted versions race, they have the same priority during the same time period. However, if larger time slots are assigned to candidates providing more patches in a limited shared candidate list, the candidates may obtain higher speeds. Such assignment may be performed by assigning a higher priority to queries. A query having a higher priority can have more time to process corresponding nodes in the tree.

Figure 10:
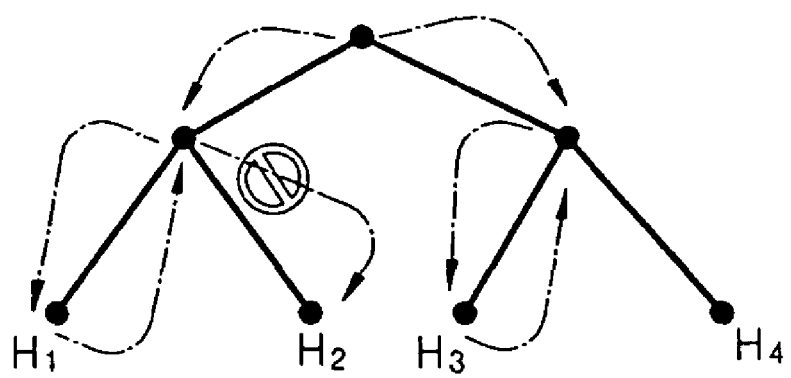
FIG. 10 illustrates a simultaneous searching process for two geometrically converted versions of a query and a shared candidate list.
Figure 10:
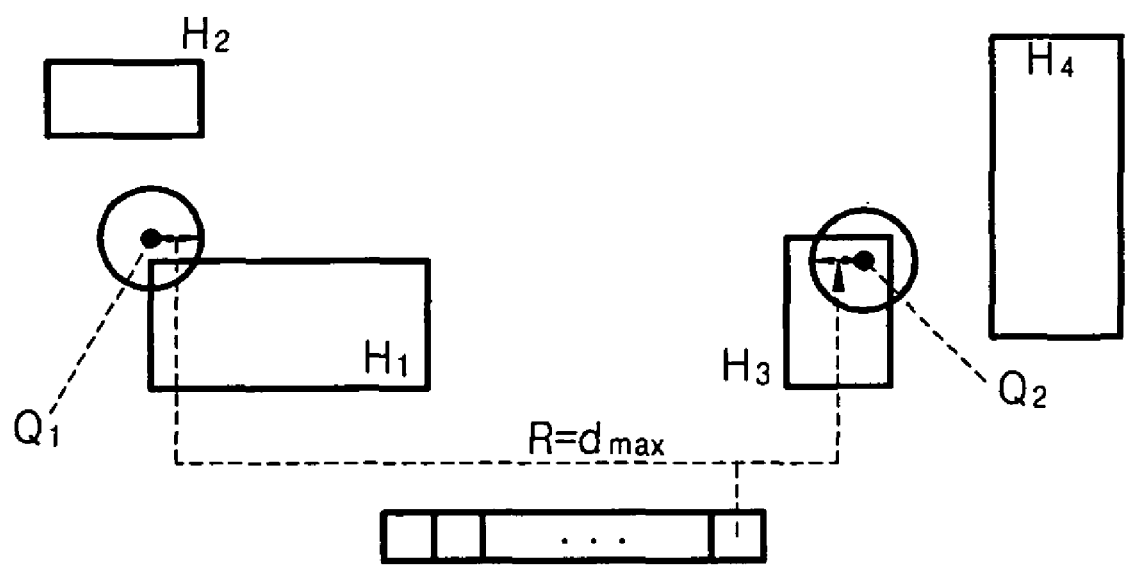

FIG. 10 illustrates a simultaneous searching process for two geometrically converted versions of a query and a shared candidate list.

Referring to FIG. 10, parallel searching for queries is simultaneously performed and searching depends on worst hits in the shared candidate list at each node. In searching, fast convergence and good hits make a set of branches to be searched denser. Assuming the same length as used as an independent query, the distance of the worst hit in the shared candidate list is not greater than the distance of the best hit among the worst hits in independent candidate lists $(d_{max,shared} \leq \min(d_{maxi}), i=1,\ldots,n)$. In FIG. 10, $d_{max} \leq d_{1,max}$ and $d_{max} \leq d_{2,max}$. Searching is not performed in the sub-space $H_2$ for the query $Q_1$ because a ball having a radius of $d_{max}$ around the query $Q_1$ does not overlap with the sub-space $H_2$.

The simultaneous searching process is performed as follows.

A process of processing nodes in a tree includes determining the order of children (junctions, e.g., internal nodes of the tree) to be searched, enumerating patches, and comparing queries at leaves, i.e., end nodes of the tree.

A trace i indicates a list of searched nodes in the tree during a current query. Initially, the list includes only a root node. By processing the root node instead of a leaf, the order of processing children of the root node is determined. The first child, i.e., a sub-tree is located at the same side as a query point in a plane branched off a parent node. During the next iteration, the first child of the root node is processed and positioned in the trace i. When both children of a node are processed or patches are compared with a query in the case of a leaf, the node is removed from the trace i. Once the trace i is empty, searching is terminated.

Several conditions for a test are evaluated before a node is processed in order to determine whether the test is required for a sub-tree of the node. The test includes the ball-cube-overlap test and the ball-within-cube test, and in the case of tolerance searching, the test includes an interval-cube-overlap test.

The present invention suggests a balancing technique called tolerance that can be defined as an intermediate stage between the optimal, but slowest exhaustive searching and the non-optimal, but fastest best branch searching. The optimal solution can be obtained between two types of searching using a simple parameter. The parameter is an epsilon ∈ that is greater than 0 and specifies a range around a vector component of a query, i.e., a hyper space around the query. Basically, branches of a KD-tree are inspected according to the following procedure. First, if a space occupied by a branch does not intersect a space defined by a query hyper-cube, searching is performed in a closer branch. If the space occupied by the branch intersects the space defined by the query hyper-cube, searching is performed in the corresponding branch.

If the epsilon ∈ is 0, the fastest best branch searching algorithm is used. However, since the number of intersections increases as the epsilon ∈ increases, a more number of branches are inspected and thus, a full search mode is reached.

Figure 11:
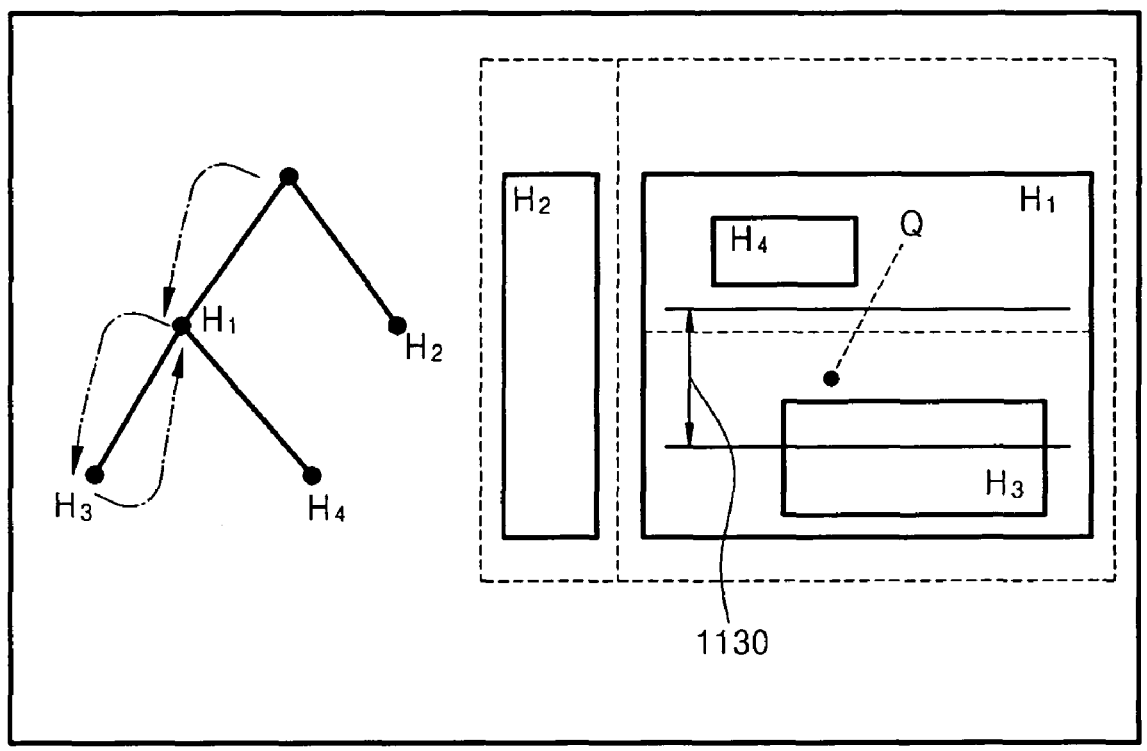
FIG. 11 is a view for explaining a tolerance searching.
Figure 12:
FIG. 12 illustrates the original boat image.

Tolerance searching will now be described in more detail with reference to FIG. 11.

In tolerance searching, an interval-cube-overlap test is introduced in addition to the ball-cube-overlap test and the ball-within-cube test. Specifying a hyper-cube of a sub-tree in a feature space prior to searching in the sub-tree overlaps a tolerance 1130 around a query in a dimension branched from a parent node. Thus, when the tolerance 1130 is set to 0, only main sub-trees are tested and searching is performed only in the best branch.

Next, in the present invention, by applying various smoothing kernels to the high-frequency image provided from the patch pair configuring unit 270 of FIG. 2, the strong visual sharpness and the high reliability of a reconstructed high-resolution image are balanced. Since a high-frequency image is a difference between the original high-resolution image and its smoothed version, it has + and − values in adjacent to the original high-resolution image and the smoothed version thereof. Statistically, the high-frequency image moves to a zero image by being strongly smoothed. Even when strong smoothing is applied to the high-frequency image, improvement in resolution may not be attained because the zero image is added to the low-resolution image. On the other hand, by applying weak smoothing to the high-frequency image, an error of the reconstructed high-resolution image can be reduced. If smoothing is not applied, the highest sharpness can be obtained, but some visual defects may occur. For example, the following convolution kernels K1 and K2 may be applied to smooth an HR band for the purpose of obtaining super-resolution with high reliability.

|      |      |      |      |
|------|------|------|------|
| K1 = | 0.05 | 0.1  | 0.05 |
|      | 0.1  | 0.4  | 0.1  |
|      | 0.05 | 0.1  | 0.05 |
| K2 = | 1/9  | 1/9  | 1/9  |
|      | 1/9  | 1/9  | 1/9  |
|      | 1/9  | 1/9  | 1/9  |

Here, K1 performs smoothing that is weaker than K2. Basically, as the patch pair database 150 generates the less optimal state, i.e., more defects, stronger smoothing should be applied. In other cases, weak smoothing is applied.

Next, in the present invention, a medium-frequency image and a low-frequency image are generated using Bicubic interpolation for low band pass filtering during training and reconstruction. In this case, according to an example-based super-resolution technique, a difference between the original high-resolution image and a Bicubic interpolated image is trained. In practice, if degraded models of high-resolution images to be reconstructed are known, other low band pass filtering mechanisms may be used. To prevent the generation of aliasing in a patch, pre-smoothing may be used prior to Bicubic interpolation. The pre-smoothing may be performed using a Gaussian kernel or a weaker smoothing convolution kernel.

In the present invention, it is assumed that three color channels are degraded in the same manner during blurring of a general image. According to the assumption, if the original low-resolution image is desired to be reconstructed using super-resolution enhancement processing, the color channels may be processed independently of one another. At this time, RGB channels may be used as a single vector. According to the assumption, a blue edge pattern may be smoothed in the same manner as a green or red edge pattern. In other words, a blue example may be used for a green channel and a red channel for reconstruction or a vice versa. By applying the same size database in this way, the variety of a training pattern can be increased. In another embodiment of the present invention, channels may be processed independently only for patches that are not easily reconstructed by a conventional method. In Equation 1, by calculating a matching error $E_1$ of medium-frequency patches, a threshold constraint can be defined when a separate color reconstructing process is initiated.

Hereinafter, performance improvement according to technical features applied to the present invention will be described in detail.

First, when a non-overlapping medium-frequency patch obtained by down-sampling and up-sampling is used, in a color image, vectors having a dimension of 2×2×3 are used in the present invention unlike a conventional super-resolution processing technique in which vectors having a dimension of at least 7×7×3 are used. Indexing and searching in a high-dimension data space have high computational complexity, searching time can be greatly reduced as the amount of data stored in a patch pair database increases. Table 1 compares the sizes of a patch pair database and searching times between different types of medium-frequency patches.

TABLE 1

| Type | Down-sampling | Overlapping | Dimension | No. of records (example) | Size [MB] (example) | Searching time [sec] (full/best branch Without and with 8 transforms) | PSNR [dB] |
|------|---------------|-------------|-----------|--------------------------|---------------------|----------------------------------------------------------------------|-----------|
| 1. (Freeman & Bishop) | No | Yes (Color) | 3(ch.) × 7 × 7 = 147 | NA | NA | NA | NA |
| 2. | Yes | Yes (Color) | 3(ch.) × 4 × 4 = 48 | 460.000 | 550 + 100 | 571/7 3700/19 | 30.24/29.84 30.33/30.08 |

TABLE 1-continued

| Type | Down-sampling | Overlapping | Dimension | No. of records (example) | Size [MB] (example) | Searching time [sec] (full/best branch Without and with 8 transforms) | PSNR [dB] |
|---|---|---|---|---|---|---|---|
| 3. | Yes | Yes (Gray) | 3(ch.) × 2 × 2 + 1(ch.) × 12 = 24 | 460.000 13levels | 550 + 50 | 270/6 1740/16 | 30.35/30.14 30.39/30.27 |
| 4. | Yes | No | 3(ch.) × 2 × 2 | 460.000 | 285 + 27 | 29/6 85/14 | 30.29/30.2 30.3/30.29 |

In Table 1, a type 1 indicates an overlapping medium-frequency patch applied in U.S. Pat. No. 6,766,067 and U.S. Patent Publication No. 2004-218834 and a type 3 and a type 4 indicate a medium-frequency patch that overlaps by one pixel and a non-overlapping medium-frequency patch only in a gray channel applied to the present invention. It can be seen from Table 1 that the size of a patch pair database and searching time are remarkably reduced in the type 4.

Second, when a plurality of geometrically converted versions of a query, i.e., a medium-frequency patch of a low-resolution image are applied, they are especially useful when the size of a patch pair database is small or a high-resolution image used for construction of the patch pair database has characteristics that are different from those of the high-resolution image to be reconstructed from the low-resolution image. In other words, when 8 geometrically converted versions of a query are applied, the same effect as having an 8-time larger size patch pair database can be attained without a need for a larger size patch pair database. An $8^{th}$ column of Table 1 shows PSNR data indicating improvement in the visual quality of a reconstructed high-resolution image when 8 geometrically converted conversions are applied. The PSNR data can be described in more detail as in Table 2.

TABLE 2

| Type | Mode of search | PSNR full/best branch |
|---|---|---|
| 2 | without transform | 30.24 dB/29.84 dB |
| 2 | with transform | 30.33 dB/30.08 dB |
| 3 | without transform | 30.35 dB/30.14 dB |
| 3 | with transform | 30.39 dB/30.27 dB |
| 4 | without transform | 30.29 dB/30.2 dB |
| 4 | with transform | 30.3 dB/30.29 dB |

It can be seen from Table 2 that visual quality improvement can be attained for all types when a searching mode including geometrical conversion is applied to a medium-frequency patch. Here, visual quality improvement ranges from 0.01 dB to 0.24 dB and better performance can be seen in a full searching mode than in a best branch searching mode.

Third, when a simultaneous searching mode is applied to geometrically converted versions of each query using a shared candidate list, equivalent performance can be obtained with a reduction of at least 40% in searching time. Two examples can be taken for the reduction in searching time. Here, searching time is given as (full reconstruction running time/KD-tree searching running time).

As the first example, in reconstruction of an image "flower" using a small-size database having 13,000 patches, when 8 types of geometrical conversion are performed, 19250 ms/17087 ms is required for full (exhaustive) searching in a serial searching mode, whereas 11813 ms/9600 ms is required for full (exhaustive) searching in a simultaneous searching mode. As the second example, in reconstruction of an image "birdhouse" using a large-size database having 300,000 patches, when 8 types of geometrical conversion are performed, 686500 ms/653818 ms is required for full (exhaustive) searching in a serial searching mode, whereas 298484 ms/268291 ms is required for full (exhaustive) searching in a simultaneous searching mode.

Fourth, when permissible limit searching is applied, as the epsilon in Equation 1 increases from 0, a more amount of searching time is required, but better reconstruction visual quality can be obtained in a mono-tone output. In addition, it can be seen that a speed improvement of at least 50% and a visual quality improvement of at least 95% can be achieved in exhaustive searching through a test. Searching time and visual quality improvement in permissible limit searching for two test images "Cameraman" and "Leaves" are as shown in Table 3.

TABLE 3

| | Cameraman (~460.000 patches) |
|---|---|
| Epsilon 10 (8 transforms, best/branch) | 9.3 sec, 26.24 dB |
| Epsilon 20 (8 transforms, best/branch) | 12 sec, 26.27 dB |
| Epsilon 40 (8 transforms, best/branch) | 33 sec, 26.28 dB |
| | Leaves (~200.000 patches) |
| Full search | 49 sec, 23.55 dB |
| Full search (8 transforms) | 424 sec, 23.6 dB |
| Best branch | 3.4 sec, 23.26 dB |
| Epsilon 20 | 6.4 sec, 23.47 dB |
| Epsilon 50 | 18 sec, 23.54 dB |
| Epsilon 100 | 35 sec, 23.54 dB |

Fifth, when a balance between visual sharpness and high reliability is applied, it is not necessary to apply strong smoothing to a high-frequency image to obtain a sharp image that satisfies human eyes, but strong smoothing should be applied to the high-frequency image to obtain a reliable fine-detail image. Thus, by applying the balance between visual sharpness and high reliability, a high-resolution image that has slightly lower sharpness but is nearly equivalent to a previously known fine-detail image can be obtained. In other words, the high-resolution image whose sharpness is slightly degraded has fewer artifacts, i.e., higher reliability.

Sixth, in training and reconstruction, good zooming results for human eyes are provided by using Bicubic interpolation for low band pass filtering to generate a medium-frequency image and a low-frequency image. Through super-resolution processing, a Bicubic interpolated image is improved using small fine-detail images.

Seventh, by dividing color channels, additional searching time is required in reconstruction of a patch having a large error $E_1$, but the visual quality of a reconstructed high-resolution image can be greatly improved.

Eighth, a smaller-size database can be obtained by compacting the KD-tree, thereby requiring a smaller space and reducing searching time.

Ninth, searching speed can be improved by applying pre-classification of patches. Such an effect can be proved by the following experimental data.

To this end, 132,243 patches obtained as a result of training using high-resolution images "garden" and "neighbor" are classified into a first class and 170,339 patches are classified into a second class. In reconstruction of a high-resolution image for the low-resolution image "birdhouse, when the best branch searching mode is implemented without low band pass filtering with respect to a high-frequency image, a result of 30.55 dB/39 sec is obtained if patch classification is applied and a result of 30.41 dB/42.5 sec is obtained if patch classification is not applied. When the exhaustive searching mode is implemented without low band pass filtering with respect to a high-frequency image, a result of 30.55 dB/155 sec is obtained if patch classification is applied and a result of 30.48 dB/216 sec is obtained if patch classification is not applied. In training, when the best branch searching mode is implemented with low band pass filtering with respect to a high-frequency image, a result of 31.97 dB/39.5 sec is obtained if patch classification is applied and a result of 31.93 dB/42.5 sec is obtained if patch classification is not applied. In training, when the exhaustive searching mode is implemented with low band pass filtering with respect to a high-frequency image, a result of 31.97 dB/156 sec is obtained if patch classification is applied and a result of 32 dB/216.5 sec is obtained if patch classification is not applied.

Figure 13:
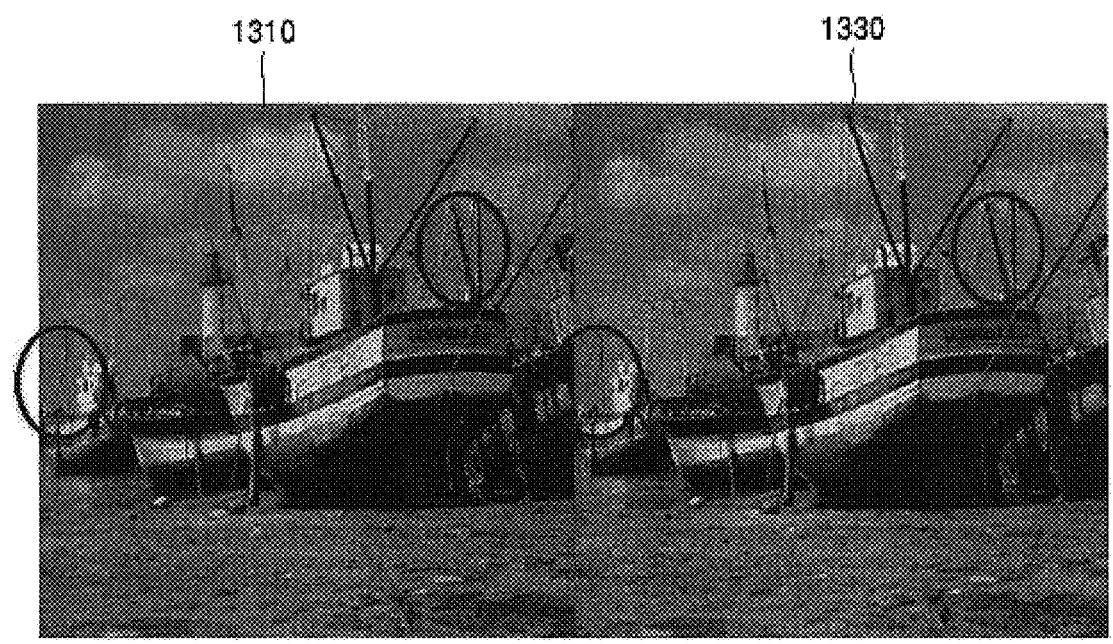
FIG. 13 illustrates boat images obtained by Bicubic interpolation and super-resolution enhancement processing with respect to a half-size boat image.
Figure 14:
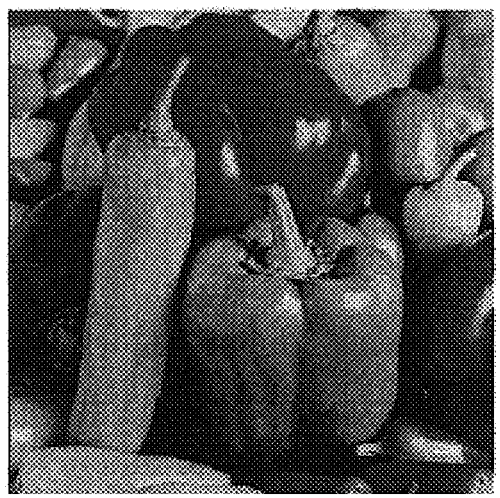
FIG. 14 illustrates the original pepper image.
Figure 15:
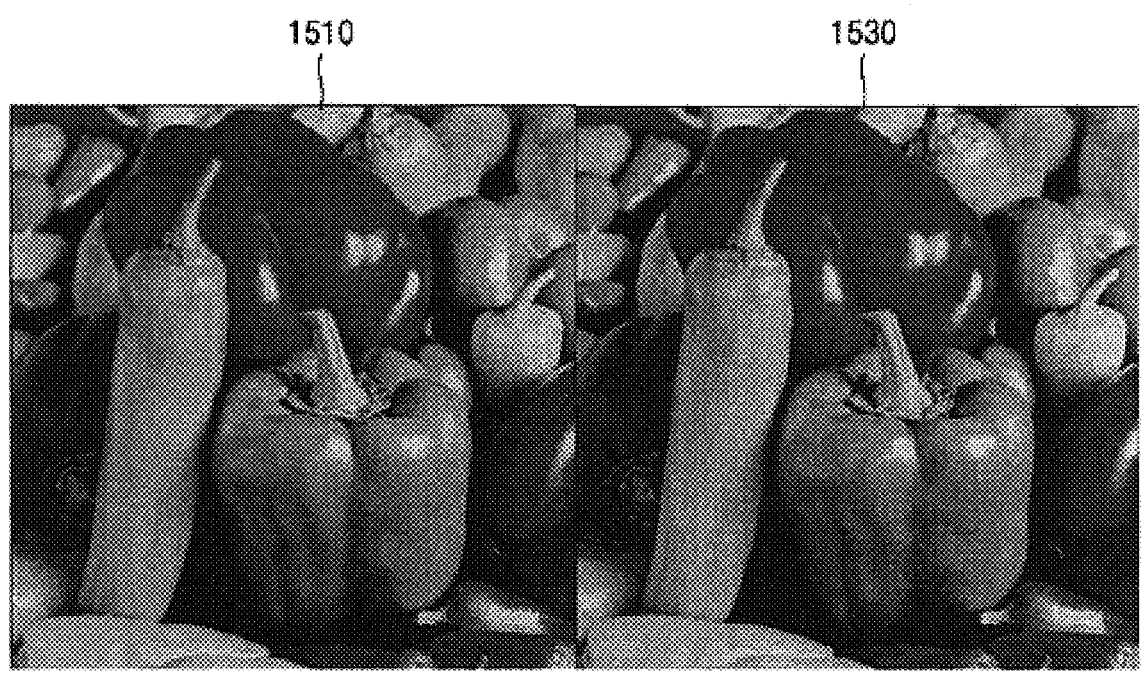
FIG. 15 illustrates pepper images obtained by Bicubic interpolation and super-resolution enhancement processing with respect to a half-size pepper image.
Figure 16:
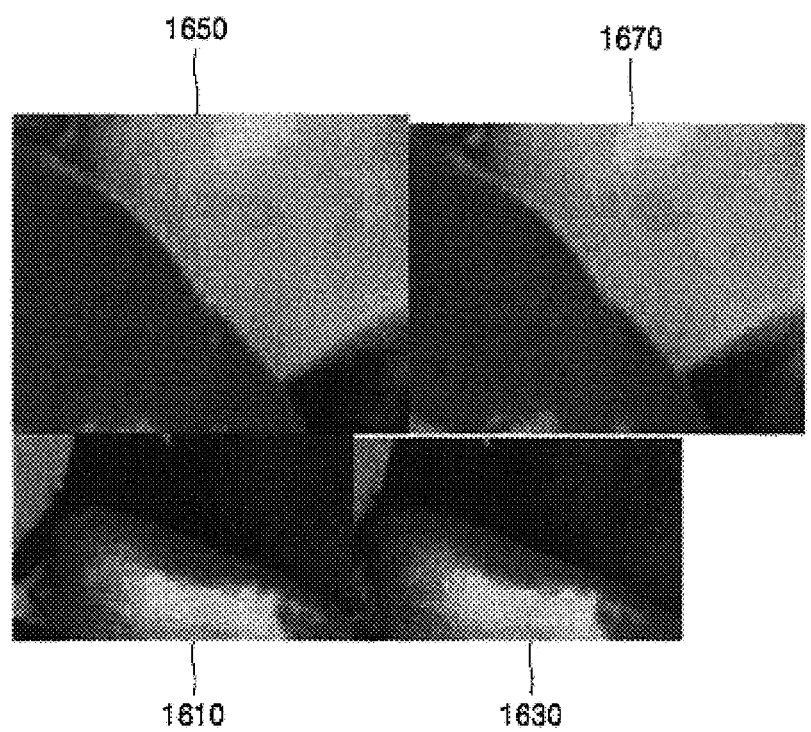
FIG. 16 illustrates an enlargement of a portion of the pepper image obtained by Bicubic interpolation with respect to the half-size pepper image and an enlargement of a portion of the pepper image obtained by super-resolution enhancement processing with respect to the half-size pepper image.

FIGS. 12 through 16 are views for comparing subjective performances of conventional Bicubic interpolation and high-resolution improvement processing according to the present invention. In FIG. 13, a left image 1310 is obtained by reducing the size of a boat image of FIG. 12 to ½ of its original size and then performing Bicubic interpolation and its PSNR is 29.85 dB, and a right image 1330 is obtained by reducing the boat image of FIG. 12 to ½ of its original size and then performing super-resolution enhancement processing and its PSNR is 30.12 dB. In FIG. 15, a left image 1510 is obtained by reducing the size of a pepper image of FIG. 14 to ½ of its original size and then performing Bicubic interpolation and its PSNR is 31.93 dB, and a right image 1530 is obtained by reducing the pepper image of FIG. 14 to ½ of its original size and then performing super-resolution enhancement processing and its PSNR is 32.34 dB. In FIG. 16, a left image 1650 is an enlargement of a portion of an image 1610 obtained by performing Bicubic interpolation with respect to the half-size pepper image and a right image 1670 is an enlargement of a portion of an image 1630 obtained by performing super-resolution enhancement processing with respect to the half-size pepper image.

It can be seen from FIGS. 13, 15, and 16 that visual quality improvement is attained when using super-resolution enhancement processing according to the present invention in comparison to when using conventional Bicubic interpolation.

As described above, according to the present invention, even when searching is performed in a patch pair database using a non-overlapping medium-frequency patch obtained by down-sampling and up-sampling, searching time can be remarkably reduced without degradation in the visual quality of a reconstructed high-resolution image. In particular, when compared to a high-resolution image obtained using Bicubic interpolation, the subjective quality, i.e., the visual quality of the reconstructed high-resolution image can be improved.

In addition to the above-described exemplary embodiments, exemplary embodiments of the present invention can also be implemented by executing computer readable code/instructions in/on a medium, e.g., a computer readable medium. The medium can correspond to any medium/media permitting the storing and/or transmission of the computer readable code.

The computer readable code/instructions can be recorded/transferred in/on a medium in a variety of ways, with examples of the medium including magnetic storage media (e.g., floppy disks, hard disks, magnetic tapes, etc.), optical recording media (e.g., CD-ROMs, or DVDs), magneto-optical media (e.g., floptical disks), hardware storage devices (e.g., read only memory media, random access memory media, flash memories etc.) and storage/transmission media such as carrier waves transmitting signals, which may include instructions, data structures, etc. Examples of storage/transmission media may include wired and/or wireless transmission (such as transmission through the Internet). Examples of wired storage/transmission media may include optical wires and metallic wires. The medium/media may also be a distributed network, so that the computer readable code/instructions is stored/transferred and executed in a distributed fashion. The computer readable code/instructions may be executed by one or more processors.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. An apparatus for super-resolution enhancement processing, the apparatus comprising:
    a low-resolution image capturing unit capturing a low-resolution image;
    a patch pair generating unit dividing each of a plurality of high-resolution images into patches and generating a plurality of patch pairs composed of medium-frequency patches and high-frequency patches for the patches;
    a patch pair database storing the plurality of patch pairs generated by the patch pair generating unit; and
    a high-resolution image reconstructing unit dividing the low-resolution image into patches, searching in the patch pair database for a patch pair including a medium-frequency patch that is similar to that of the low-resolution image, and generating a reconstructed high-resolution image by inserting a high-frequency patch included in the found patch pair into a corresponding patch of the low-resolution image,
    wherein the high-resolution image reconstructing unit performs simultaneous searching of the patch pair database for a plurality of geometrically converted versions of the medium-frequency patch using a shared candidate list.

2. The apparatus of claim 1, further comprising a patch merging unit which is positioned between the patch pair generating unit and the patch pair database and merges similar patches in leaves of a tree to reduce the redundancy of the patch pair database.

3. The apparatus of claim 2, wherein the patch merging unit obtains a difference between an average patch and an individual patch in each of the leaves of the tree and generates a new tree by replacing an individual patch that is similar to the average patch with the average patch.

4. The apparatus of claim 1, further comprising a patch classifying unit which is positioned between the patch pair generating unit and the patch pair database and classifies the medium-frequency patches to configure or use different databases according to the variance of the medium-frequency patches.

5. The apparatus of claim 1, wherein the patch pair generating unit comprises:
a high-frequency patch generating unit generating the high-frequency patches from the high-resolution image;
a medium-frequency patch generating unit generating the medium-frequency patches from an intermediate image; and
a patch pair configuring unit configuring the patch pairs with the high-frequency patches, the medium-frequency patches, and a plurality of overlapping edge pixels of the high-frequency patches.

6. The apparatus of claim 5, wherein the patch pair configuring unit performs smoothing on the high-frequency patches.

7. The apparatus of claim 1, wherein the high-resolution image reconstructing unit comprises:
a medium-frequency patch generating unit generating a medium-frequency patch from the low-resolution image;
a searching unit performing searching in the patch pair database using the medium-frequency patch and a plurality of edge pixels included in a high-frequency patch included in the reconstructed high-resolution image; and
an adding unit adding a high-frequency patch obtained by the searching of the searching unit to a corresponding patch of the low-resolution image.

8. The apparatus of claim 1, wherein the medium-frequency patch is configured not to overlap its adjacent patches.

9. The apparatus of claim 1, wherein the medium-frequency patch is configured to overlap its adjacent patches by one pixel in a gray channel.

10. A method for super-resolution enhancement processing, the method comprising:
dividing each of a plurality of high-resolution images into patches, generating a plurality of patch pairs composed of medium-frequency patches and high-frequency patches for the patches, and storing the generated patch pairs in a patch pair database; and
dividing a low-resolution image into patches, searching in the patch pair database for a patch pair including a medium-frequency patch that is similar to that of the low-resolution image, and generating a reconstructed high-resolution image by inserting a high-frequency patch included in the found patch pair into a corresponding patch of the low-resolution image,
wherein the searching in the patch pair database performs simultaneous searching of the patch pair database for a plurality of geometrically converted versions of the medium-frequency patch using a shared candidate list.

11. The method of claim 10, further comprising merging similar patches in leaves of a tree to reduce the redundancy of the patch pair database.

12. The method of claim 11, wherein the merging of the similar patches comprises:
obtaining an average patch in each of the leaves of the tree;
obtaining a difference between the average patch and an individual patch in each of the leaves of the tree; and
generating a new tree by replacing an individual patch that is similar to the average patch with the average patch.

13. The method of claim 10, further comprising classifying the medium-frequency patches to configure or use different databases according to the variance of the medium-frequency patches.

14. The method of claim 13, wherein the classifying of the medium-frequency patches comprises:
calculating the variance of the medium-frequency patches of the high-resolution image during training;
determining a class according to the calculated variance;
storing the medium-frequency patches in the determined class in the patch pair database;
calculating the variance of the medium-frequency patches of the low-resolution image during reconstruction; and
searching in the patch pair database for the medium-frequency patches of the high-resolution image stored in the determined class according to the variance of the medium-frequency patches of the low-resolution image.

15. The method of claim 10, further comprising performing smoothing on the high-frequency patches of the high-resolution images.

16. At least one computer readable medium storing instructions that control at least one processor to perform a method for super-resolution enhancement processing claimed in claim 10.

* * * * *